Patented July 14, 1925.

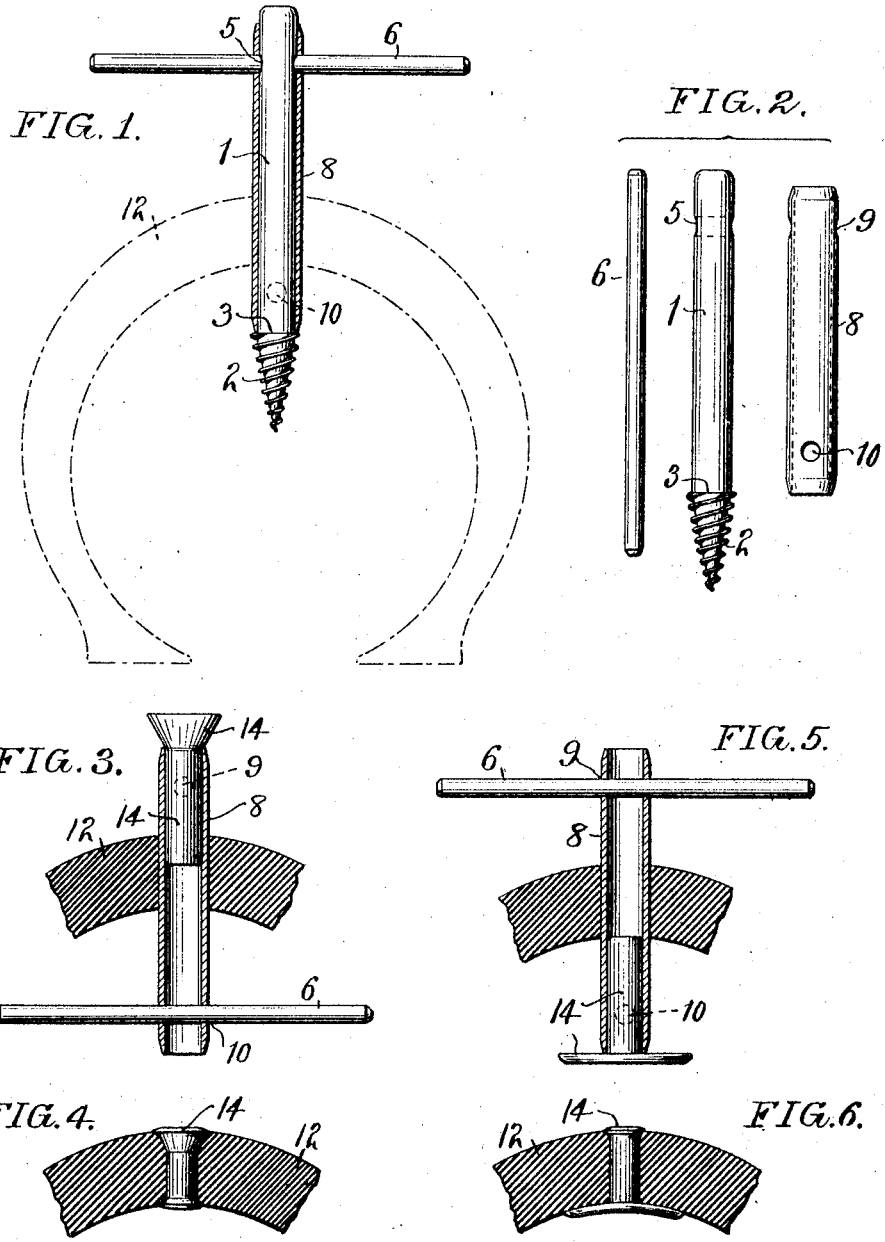

1,545,831

UNITED STATES PATENT OFFICE.

HARRY R. HIRST, OF TRENTON, NEW JERSEY.

TIRE-REPAIR TOOL.

Application filed July 2, 1924. Serial No. 723,624.

*To all whom it may concern:*

Be it known that I, HARRY R. HIRST, a citizen of the United States, residing at Trenton, in the county of Mercer and State of New Jersey, have invented certain new and useful Improvements in a Tire-Repair Tool, of which the following is a specification.

My invention relates to a tire repair tool, adapted for inserting a plug in a tire, particularly the outer shoe or casing of an automobile tire.

When a tire has received a puncture, the life of the tire will be prolonged if the tire is repaired by plugging the hole to exclude sand and water, and the object of my invention is to provide a tool for inserting a rubber plug in the tire after it has received a puncture; a further object of my invention is to provide a tool with which a plug, having a head thereon, may be inserted in a tire, in either direction, so that the head of the plug will be positioned upon either the inner surface or the outer surface of the tire, according to the size of the puncture in the tire.

Referring to the accompanying drawing; Fig. 1, is a view in elevation, partly in section, of the tool and showing a tire in dot and dash lines; Fig. 2, is a view in elevation showing the parts of the tool detached; Fig. 3, is a sectional view of the sleeve member of the tool showing how a plug is inserted with the head on the outside of the tire; Fig. 4, is a transverse sectional view of a portion of a tire showing the plug as illustrated in Fig. 3, after the tool has been removed; Fig. 5, is a view similar to Fig. 3, showing how a plug is inserted with the head on the inside of the tire, and Fig. 6, is a view similar to Fig. 4, showing the plug, as illustrated in Fig. 4, after the tool has been removed.

In the accompanying drawings, in which like reference characters refer to like parts, 1 illustrates a rod having a head 2, formed upon one end thereof. The head is tapered and provided with a screw-thread, such as formed upon large wood screws. A shoulder 3 is formed between the rod and the head. The rod 1 is provided with a transverse hole 5 for the attachment of a bar 6 forming a handle which slips into said hole and is readily detachable.

A sleeve, or cylindrical member, 8 is adapted to be loosely mounted upon the rod 1. Said sleeve is provided with transverse holes 9 and 10 located at either end thereof. One of said holes 9 or 10 will align with the hole 5 in the rod 1 when the sleeve 8 is upon the rod with the end of the sleeve abutting against the shoulder 3 of the rod, thus permitting the handle 6 to be readily inserted through both the rod and the sleeve, as shown in Fig. 1.

The tool is inserted into a puncture in the tire 12 by turning the tool so that the threaded head will force its way through the tire, the puncture in the tire may be thus enlarged so that the sleeve 8 will enter the tire, as shown in Fig. 1. The threaded head stretches the material of the tire and increases the size of the puncture, but does not cut away, or ream, the material of the tire.

The handle 6 is withdrawn, which permits the rod 1 to be withdrawn, thus leaving the sleeve 8 remaining in the tire, as shown in Fig. 3. A rubber repair plug 14 is inserted into the tubular recess formed at either end of the sleeve 8 and the handle 6 is inserted in the sleeve 8. As the sleeve 8 is provided with holes 9 and 10 located at opposite ends thereof, the handle may be inserted in the hole at the opposite end of the sleeve from the end containing the plug 14.

If it is desired to insert a plug with a head on the outer surface of the tire, the handle 6 may be attached to the sleeve 8, as shown in Fig. 3, so that the sleeve may be pulled towards the inside of the tire 12 and the plug will remain in the tire, as shown in Fig. 4, after the sleeve is withdrawn.

If it is desired to have the head of the plug on the inner surface of the tire, the plug can be inserted at the inner end of the sleeve 8, as shown in Fig. 5, and the handle 6 inserted through the hole at the opposite end of the sleeve. The handle can thus be pulled to withdraw the sleeve and allow the head to remain on the inside of the tire, as shown in Fig. 6.

Cement may be placed around the head of the plug before it is drawn tightly into the tire and the protruding shank, or small end of the plug, may be engaged with a pair of pinchers and pulled to stretch the shank so that cement can be placed around the shank and when released the shank will draw the cement into the tire. The protruding portions of the head or shank of the plug may be readily trimmed off, as shown in Figs. 4 and 6.

I claim:—

1. A tire repair tool comprising a cylindrical member adapted to be inserted into an aperture in a tire, said member adapted to receive a repair plug which is to be inserted in the aperture in the tire, said member having transverse holes formed through the same located adjacent to either end thereof, and a bar adapted to be inserted into either of said transverse holes in said member adapted to form a detachable handle for either pushing or pulling said member through the tire.

2. A tire repair tool comprising a rod having a tapered end formed thereon, a sleeve removably mounted upon the rod, a handle removably secured to said rod adapted to retain the sleeve upon the rod, and said sleeve adapted to have said handle attached thereto when the rod is withdrawn from the sleeve.

3. A tire repair tool comprising a rod, a conical head upon said rod, a screw thread formed upon said head, a sleeve removably mounted upon said rod, said head having a portion forming a shoulder adapted to engage one end of the sleeve, said rod and said sleeve having transverse holes formed therethrough in alignment and located adjacent to the end of the rod opposite said head, a handle adapted to be inserted in said holes and retain the sleeve upon the rod and adapted for pushing the rod and sleeve into an aperture in a tire, said handle and said rod being removable from the sleeve when the sleeve is inserted in a tire and said sleeve having a hole formed adjacent to the opposite end thereof, said holes formed at either end of said sleeve adapted to receive said handle for withdrawing the sleeve from the tire in either direction.

In testimony whereof I affix my signature.

HARRY R. HIRST.